3,409,442
NO-BAKE CAKE MIX

Harry W. Block, East Orange, N.J., and Thomas P. Finucane, Hartsdale, and Ernest Lanza, North Tarrytown, N.Y., assignors to General Foods Corporation, White Plains, N.Y., a corporation of Delaware
No Drawing. Continuation-in-part of application Ser. No. 210,572, July 7, 1962. This application July 27, 1964, Ser. No. 385,462
12 Claims. (Cl. 99—92)

---

ABSTRACT OF THE DISCLOSURE

Preparation of a no-bake pastry product by hydrating a whippable solid hydrophilic gelatinous substance with an aqueous medium, whipping to a foam and blending with dried pastry crumbs.

---

This application is a continuation-in-part of application Ser. No. 210,572, filed July 17, 1962, now abandoned.

This invention relates to the manufacture of simulated baked goods which can be prepared by the consumer without the necessity of batter preparation or the use of heat. More specifically, this invention is concerned with a bakery product using shortening, which product requires no baking by the consumer and can be prepared by a simplified recipe preparation while possessing a texture, taste, mouthfeel and other qualities similar to a bakery product prepared in the conventional manner.

The field of bakery products, and more specifically, the cake mix industry, has sought to produce a product which could be prepared in a convenient form, such as a blend of dry mix ingredients, and then reconstituted to a baked consistency by adding water and whipping or stirring to a desired consistency. The elimination of heat in the reconstitution step would reduce the need for expensive emulsifiers in batter preparation, as well as allowing the use of cake ingredients which are degraded by heat. While food technologists have in the past produced "no-bake" products which could be reconstituted on the addition of water without the use of heat, these products have not approached the desired texture, taste, and mouthfeel of the conventional, oven-baked product. This is especially true when the product is manufactured in a dry mix or granulated form that is stable to deterioration and does not require storing at refrigeration temperatures.

It is an object of the present invention to provide a "no-bake" bakery product, such as a dry mix cake, which does not require heating by the consumer to be reconstituted and which product offers the texture, taste, mouthfeel, and other qualities similar to a conventionally cooked bakery product.

Another object of this invention is the provision of a dry-mix bakery product which may reconstitute in minutes by whipping after the simple addition of water to the dry mix.

Another object of the invention is the provision of a bakery product which may include ingredients which are degraded by the application of heat, normally required in oven baking.

Still another object of the invention is the provision of a bakery product which will reduce the need for expensive fat emulsifiers which are necessary in a normal batter to be baked.

This invention is founded on the discovery that the above objectives can be accomplished in a product comprising a baked and dehydrated bakery product in crumb-like form and an edible binder. The edible binder material includes a hydrophilic gelatinous substance which is normally solid at room temperature, stable to deteriation, dispersible on contact with water, and whippable to a hydrated foam capable of setting to a semi-solid state by a uniform release of the water in the foam to the precooked and dehydrated bakery crumbs so as to achieve a reconstituted product similar to a baked product.

In accordance with the present invention a bakery product, such as a cake, is comminuted or ground into a crumb-like form and intimately blended with a foam which serves to pass to the crumbs the requisite quantity of moisture for optimum and uniform hydration. In this manner a tender, moist product is achieved.

More particularly, the foamed system of the present invention may be described as comprising a composition which is capable of being aerated by the ingestion of a quantity of air in a cellular structure by various ways. The foam system may be subjected to whipping, beating or other similar technique for generating a gas leavening phase (typically, air). The gas leavening phase has air pockets which will support a more or less continuous structure whereby the dehydrated particulate crumbs can be suitably oriented with respect to such leavening agent to absorb the moisture from the whipped structure rapidly and uniformly.

The edible binder material should contain a hydrophilic gelatinous substance, such as gelatin, capable of dispersion in water into a whippable foam which is brought into intimate relationship with the dehydrated crumb particles and effectively retains the moisture content initially absorbed by the crumbs thereon. In the case of cakes, the foam structure of the present invention is typified by the inclusion in a sugar solution of a whippable protein, preferably a degraded whippable protein other than gelatin, such as the hydrolyzed water soluble proteinaceous extract of soy bean meal, gliadin, and other whippable cereal proteins isolated from oats, corn, hemp and the like. All of these whippable, proteinaceous materials are capable of being aerated in the presence of a sugar solution to provide a high overrun and frothy cellular structure for commingling with the cake crumbs. Such degraded whippable proteins need not be heat coagulable, although the use of the more conventional heat coagulable proteins, such as egg white, is not foreclosed. However, such proteinaceous material should be operative to whip in the presence of a sugar solution to a high overrun in a reasonably convenient period of time.

Although the preferred hydrophilic gelatinous substance or colloid for use in the binder of this invention is gelatin of high bloom, other proteinaceous materials, cellulose ethers and gums may be combined with or employed in place of the gelatin. Included among these gelatinous materials are extracts of various seaweeds such as algin, carrageenin, Eucheuma, pectin, gum arabic, gum tragacanth and gum karaya. Edible grades of synthesized cellulosic materials, such as the water soluble salts of carboxymethyl cellulose and ionic esters and ethers of cellulose, such as the akyl celuoses, i.e., methy celluose— may also be used. In addition to these colloids, starch derivatives derived from tapioca, potatoes, corn, wheat, both raw and gelatinized, can also be employed to like advantage.

The level of the various degraded whipping proteins as well as the hydrophilic gelatinous substance can vary within wide limits depending upon the functionality of the protein and the colloid in combination. All of these variations will suggest themselves to one skilled in this art.

In the case of a "no-bake" cake, the level of the proteinaceous whipping material used, as well as the level of hydrophilic gelatinous substance will be a very minor fraction by weight of the solution employed to entrap the leavening air for formation of the system intended to enable rehydration of the cake crumb. In general, the foam system of the "no-bake" cake formulation will correspond substantially to the level of sugar and whip ingredients called for in the preparation of a sugar whip for use in a batter-type cake, e.g., an angel food cake, with the exception that a heat coagulable protein will not necessarily be employed. In accordance with a typical embodiment of the present invention, about 70 parts by weight of sugar, 7 parts of gelatin and 4 parts of a hydrolyzed soy protein will be employed on a dry weight basis, which ingredients will be dissolved in hot tap water to provide the equivalent of a 20% sugar solution which may be whipped in any conventional mechanical or hand whipper to a high overrun usually in the order of 150–250% depending upon the period of whipping time employed. Other whipping agents may be employed in lieu of or in addition to hydrolyzed soy protein.

The baked crumbs of the present invention essentially comprise sugar, starch, protein and a fatty constituent. In a more conventional form of cake crumbs, either a high or low ratio shortening cake may be prepared by the usual batter preparation, which uses a chemical gas leavening agent, and during which batter preparation the shortening will be creamed with respect to the sugar and starch while having moisture added to the farinaceous ingredients. The batter will then be baked in an oven at an elevated temperature which causes the leavening gas evolved in the batter to expand and establish a porous cellular cake structure. This cake will thereafter be dehydrated under mild temperatures which avoid undue discoloration of the cake and subdivided or comminuted to a particular form of fineness whereat the origin of the cake crumb cannot be distinguished from the crumb itself. The dehydrated cake product will preferably be ground to a particulate form such that 100% of the crumbs will pass a #10 mesh U.S. Standard sieve screen and 95% will be retained on a #20 mesh U.S. Standard sieve screen. However, it is within the scope of this invention to use crumbs which are relatively large or relatively small in particle size and crumbs which pass through a #6 mesh U.S. Standard sieve screen are operative as are crumbs which pass through a #30 or #40 mesh U.S. Standard sieve screen.

When the commingled cake or other bakery crumbs are deposited in the form of a layer and viewed with the unaided eye, the crumbs aggregate into the form of typical shortening cake structure in terms of coarseness of grain, texture, and overall appearance. Dehydration of the shortening cake will be carried to a point which facilitates subdivision of the cake to the desired crumb size. However, this drying should not proceed to a point which reduces the moisture content of the product to below a level which gives excessive case-hardening. Excessive drying may cause hydration in a reasonable time to be inhibited. Thus, the dehydration should be carried out under such temperature and time conditions as will avoid undue gelatinization, dextrinization, charring, and overall insolubilization of the starchy component of the cake.

In accordance with the present invention, therefore, the cake may be dehydrated in an oven having air recirculated at a temperature below 150° F. Although it is foreseen that other drying apparatus may be used, such as belt dryer, vacuum freeze drying, or a vacuum tray drying, it is preferred to dry in an oven having recirculated air. Generally, the moisture content of the shortening cake prior to comminution will be above 15% and may be carried down prior to comminution to a stable moisture content of about 4%. In some cases granulation may be followed by further dehydration to a stable moisture content which permits packaging of the crumb for distribution in trade channels where storage stability is an important factor.

In the formulation of a shortening cake according to the present invention, the flavor and coloring ingredients which are normally employed in formulating the cake need not be added prior to batter preparation. Indeed, it is a feature of the present invention that the flavoring and coloring constituents are preferably added either as part of the edible binder system or in intimate mixture with the dry crumb component for preparing the "no-bake" bakery product, whereby elevated temperatures such as result in loss of desired aroma and flavor qualities are avoided while preserving the overall acceptability of the product. In this manner a much wider range of flavor and coloring ingredients is possible. Accordingly, the initial components of the foregoing shortening cake ingredients need not have added thereto prior to baking any of the customary flavoring materials, such as cocoa powder and vanillin, which are more advantageously incorporated after the dehydrated crumb has been produced.

The bakery crumbs used in the present invention can be sold in a package with instructions to the consumer to fold, blend, or mix the dehydrated crumbs into a whipped foam previously prepared from the edible binder. Alternatively, instead of a two package mix, the dehydrated crumbs may be blended with the edible binder in a form suitable for a one package mix which may be simply added to water and whipped to achieve a hydrated and aerated foam which sets to a stiff, semi-solid state simulating in all respects the texture and appearance of a normally baked product. The rehydration of the crumbs will be accomplished during the whipping and the foam will set upon completion of the rehydration of the crumbs. Therefore, either a dual or single package mix is contemplated for rehydrating the bakery crumbs in a whipped foam of edible binder, water and air. The crumbs should be intimately mixed into the aerated foam system and then molded into the intended shape for completion of the rehydration step. This latter step may be aided by a period of refrigeration. It has been found that refrigeration at normal refrigeration temperatures of 35° to 45° F. helps to set the product to the desired consistency.

Also, although it is contemplated that no overt heating is necessary in combining the dehydrated crumbs with the whip components of the present invention to produce the no-bake product of this invention, it may well be desirable for certain flavor advantages to gently warm the ingredients so that they may be served in a heated and more flavorful condition.

The mechanism whereby the dehydrated cake crumbs reconstitute and through such reconstitution aggregate into a cake with a desirable mouthfeel, texture, taste and appearance is at present not fully understood. However, it is believed that in the case where a soluble whipping protein is used together with a hydrophilic gelatinous substance the whippable protein upon dehydration by the starch material present in the dry cake crumb forms a continuous film of solid protein, which structure binds together the rehydrated crumb. It is further believed that the hydrophilic gelatinous substance, such as gelatin, serves a duel function of retaining the added moisture and providing a controlled and uniform release of the rehydrating water to the dry crumbs, while at the same time adding to the strength of the continuous protein film.

The present invention will be better understood by reference to the following examples of the preparation of no-bake products:

EXAMPLE I

Conventional baked cake formula

| Cake ingredients: | Percent |
| --- | --- |
| Sugar | 42.00 |
| Cake flour | 39.00 |
| Shortening | 12.00 |
| Powdered milk solids (non-fat) | 4.40 |
| Baking powder | 1.30 |
| Salt | 1.00 |
| Flavoring | 0.30 |
| | 100.00 |

The above ingredients were mixed, placed in molds and oven baked at 365° F. for about 45 minutes. The baked cake was then cut into strips 6 inches long and ¼ inch wide and placed in trays in a dryer. The cake strips were dried in recirculated air at 150° F. for 45 minutes to reduce the baked cake moisture level to about 5%. The dried strips were then crushed in a Fitzpatrick mill and screened through a #10 mesh U.S. Standard sieve screen so that 100% of the cake crumbs passed through the #10 mesh U.S. Standard sieve while 95% were retained on a #20 mesh U.S. Standard sieve.

The above cake crumbs were then mixed with egg albumin as the edible binder in following weight percentages:

| Ingredients: | Percent |
| --- | --- |
| Dried cake crumbs (through #10 mesh on #20 mesh) | 74.00 |
| Water | 16.00 |
| Dried egg albumin | 10.00 |
| | 100.00 |

The dried cake crumbs and dried egg albumin were blended thoroughly to achieve an homogeneous mixture. About 85 grams of the dry blend was then added to a mixer bowl together with 20 grams of water. The mixture was then blended at high speed for 30 seconds, removed from the bowl and pressed into a cake mold.

In about 5 minutes the resultant no-bake cake had a texture, flavor, mouthfeel and other qualities similar to a conventional, oven-prepared cake.

EXAMPLE II

| Ingredients | Weight/Grams | Percent |
| --- | --- | --- |
| Binder System: | | |
| Sugar | 20.0 | 5.10 |
| Animal Gelatin | 2.0 | 0.50 |
| Soy Protein Whipping Agent | 1.2 | 0.35 |
| Water | 100.0 | 25.40 |
| Dried Cake Crumbs (through #8 mesh on #30 mesh) | 270.0 | 68.65 |
| | | 100.00 |

The baked cake was prepared according to Example I and ground into crumb-like form so that 100% of the cake crumbs passed through a #8 mesh U.S. Standard sieve screen while 95% were retained on a #30 mesh U.S. Standard sieve screen. The binder ingredients were placed in a mixer bowl while also adding 100 ml. of warm tap water. The mixture was blended in an electric mixer at low speed for 30 seconds and then at high speed for 3 minutes until the foamed binder retained soft peaks. The dried cake crumbs were then folded or mixed into the whipped foam and spoon stirred for 30 seconds. The whipped binder-cake crumb mixture was then poured into an aluminum cake pan, molded to shape with a spoon, and refrigerated for 5 minutes and removed from the aluminum pan.

The no-bake cake had a texture, taste, mouthfeel and other qualities similar to a conventionally cooked cake.

EXAMPLE III

| Ingredients | Weight/Grams | Percent |
| --- | --- | --- |
| Binder system: | | |
| Sugar | 30.0 | 3.70 |
| Gelatin | 3.5 | 0.70 |
| Soy Protein | 2.0 | 0.45 |
| Flavor | 1.5 | 0.30 |
| Chocolate Color | 0.3 | 0.05 |
| Water | 100.0 | 18.00 |
| Dried Cake Crumbs (through #6 on #40) | 418.0 | 76.80 |
| | | 100.00 |

The cake was baked and dehydrated according to Example I and ground into crumb-like form so that substantially all the crumbs passed a #6 mesh U.S. Standard sieve screen while being retained on a #40 mesh U.S. Standard sieve screen. The binder ingredients were placed in a mixing bowl to which 100 ml. of hot tap water was added. The mixture was blended slowly with an electric mixer for 30 seconds and then at high speed for 3 minutes until the whipped foam held soft peaks. The cake crumbs were then folded into the whipped foam until all the crumbs were uniformly moistened. The whipped mixture of binder and cake crumbs was then poured into an aluminum cake pan, pressed gently into the shape of the pan and refrigerated for about 5 minutes.

The no-bake cake was then served in combination with a conventional icing while having the texture, taste, mouthfeel and all other qualities similar to that of a conventionally baked cake.

While this invention has been described by reference to specific examples, it is intended to be limited only by the scope of the following appended claims.

What is claimed is:

1. A substantially dry pastry mix that does not require baking to convert it to a pastry product, comprising a major portion of prebaked dried pastry crumbs and at least 10 percent by weight of an edible binder comprising a solid hydrophilic gelatinous substance whippable to a foam after hydration with an aqueous medium selected from the group consisting of water and aqueous solutions of milk solids, the foam setting to an aerated colloidal state as the prebaked crumbs absorb water from the foam to form a pastry product of crumbs in a foam matrix, with the resulting product having a texture similar to a baked product.

2. A mix as claimed in claim 1, in which said hydrophilic gelatinous substance is gelatin.

3. A substantially dry pastry mix that does not require baking to convert it to a pastry product comprising a major portion of prebaked dried pastry crumbs and at least 0.85 percent by weight of an edible binder comprising gelatin and a whippable protein, said binder being whippable after hydration with an aqueous medium selected from the group consisting of water and aqueous solutions of milk solids, to a foam that sets to an aerated colloidal state as the prebaked crumbs absorb water from the foam to form a pastry product of crumbs in a foam matrix, with the resulting product having a texture similar to a baked product.

4. A substantially dry cake mix that does not require baking to convert it to a pastry product, comprising a major portion of prebaked dried cake crumbs and at least 10 percent by weight of gelatin whippable to a foam after hydration with an aqueous medium selected from the group consisting of water and aqueous solutions of milk solids, the foam setting to an aerated colloidal state as the prebaked crumbs absorb water from the foam to form a cake of crumbs in a foam matrix, with the resulting cake having a texture similar to a baked cake.

5. A mix as claimed in claim 4, in which the dried cake crumbs have a particle size such that substantially all of the crumbs pass a #6 mesh U.S. Standard sieve screen and are retained on a #40 mesh screen.

6. A mix as claimed in claim 4, in which the dried cake crumbs have a particle size such that substantially all of the crumbs pass a #10 mesh U.S. Standard sieve screen and are retained on a #20 mesh screen.

7. The process of preparing a no-bake pastry product having a texture similar to that of a baked product, which comprises hydrating at least 10 percent by weight of a whippable solid hydrophilic gelatinous substance with an aqueous medium, selected from the group consisting of water and aqueous solutions of milk solids, whipping the hydrated gelatinous substance to an aerated foam, and blending the foam with stable dried pastry crumbs.

8. The process of preparing a no-bake pastry product having a texture similar to that of a baked product, which comprises hydrating at least 10 percent by weight of a solid mixture of a whippable hydrophilic gelatinous substance and a whippable protein with an aqueous medium selected from the group consisting of water and aqueous solutions of milk solids, whipping the hydrated mixture to an aerated foam, and blending the foam with stable dried pastry crumbs.

9. The process of preparing a no-bake pastry product having a texture similar to that of a baked product, which comprises hydrating at least 10 percent by weight of gelatin with an aqueous medium selected from the group consisting of water and aqueous solutions of milk solids, whipping the hydrated gelatin to an aerated foam, blending the foam with stable dried pastry crumbs, and refrigerating the blended foam until it sets.

10. The process of preparing a no-bake pastry product having a texture similar to that of a baked product, which comprises blending in the solid state dried pastry crumbs and at least 10 percent by weight of an edible binder comprising a hydrophilic gelatinous substance, adding an aqueous medium selected from the group consisting of water and aqueous solutions of milk solids to the mixture to hydrate the gelatinous substance, and whipping the mixture to an aerated foam in which the stable pastry crumbs are suspended.

11. The process of preparing a no-bake cake having a texture similar to that of a baked cake, which comprises blending in the solid state dried cake crumbs and at least 0.85 percent by weight of a binder system comprising gelatin and whippable soy protein, adding an aqueous medium selected from the group consisting of water and aqueous solutions of milk solids to the mixture to hydrate the gelatinous substance, and whipping the mixture to an aerated foam in which the stable cake crumbs are suspended.

12. The process of preparing a no-bake pastry product having a texture similar to that of a baked product, which comprises adding an aqueous medium selected from the group consisting of water and aqueous solutions of milk solids to a mixture of pastry crumbs and at least 10 percent by weight of an edible binder including a whippable hydrophilic gelatinous substance to hydrate the gelatinous substance, and whipping the mixture to an aerated foam in which the stable pastry crumbs are suspended.

References Cited

UNITED STATES PATENTS

| 85,070 | 11/1867 | Coleman et al. | 99—90 |
| 518,891 | 4/1894 | Manwaring | 99—90 |
| 701,742 | 6/1902 | Lambert | 99—90 |

FOREIGN PATENTS

| 563,170 | 8/1944 | Great Britain. |

RAYMOND N. JONES, *Primary Examiner.*